(12) United States Patent
Hendriks et al.

(10) Patent No.: US 7,355,584 B2
(45) Date of Patent: Apr. 8, 2008

(54) PROJECTOR AND CAMERA ARRANGEMENT WITH SHARED OPTICS AND OPTICAL MARKER FOR USE WITH WHITEBOARD SYSTEMS

(75) Inventors: Ferdinand Hendriks, Yorktown Heights, NY (US); Zon-Yin Shae, South Salem, NY (US); Belle L. Tseng, Cupertino, CA (US); Xiping Wang, Putnam County, NY (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 11/080,315

(22) Filed: Mar. 15, 2005

(65) Prior Publication Data

US 2005/0162409 A1 Jul. 28, 2005

Related U.S. Application Data

(62) Division of application No. 10/315,739, filed on Dec. 10, 2002, now Pat. No. 7,136,053.

(51) Int. Cl.
*G09G 5/00* (2006.01)
(52) U.S. Cl. ..................... 345/156; 345/169
(58) Field of Classification Search ........ 345/156–176, 345/179; 250/221, 549; 178/18.01, 18.09; 356/3.01; 341/5; 358/478
See application file for complete search history.

(56) References Cited

U.S. PATENT DOCUMENTS

| 5,422,693 | A * | 6/1995 | Vogeley et al. ............. 353/122 |
| 5,504,501 | A * | 4/1996 | Hauck et al. ............... 345/158 |
| 5,889,505 | A | 3/1999 | Toyama et al. |
| 6,404,416 | B1 * | 6/2002 | Kahn et al. ................. 345/158 |
| 6,593,908 | B1 * | 7/2003 | Borgstrom et al. ......... 345/156 |
| 6,710,770 | B2 * | 3/2004 | Tomasi et al. ............... 345/168 |
| 2002/0021287 | A1 * | 2/2002 | Tomasi et al. ............... 345/168 |
| 2004/0201857 | A1 * | 10/2004 | Foxlin ......................... 356/620 |
| 2005/0024324 | A1 * | 2/2005 | Tomasi et al. ............... 345/156 |

OTHER PUBLICATIONS

U.S. Appl. No. 09/642,531, filed Aug. 18, 2000, F. Hendriks et al., "Methods and Apparatus for Associating a User with Content in a Collaborative Whiteboard System."
M.E. Munich et al., "Visual Input For Pen-Based Computers," Proceedings of ICPR'96, IEEE, pp. 33-37, 1996.
P. Wellner, "Interacting With Paper On The Digital Desk," Communications of the ACM, vol. 36, No. 7, pp. 87-96, Jul. 1993.
S. Elrod et al., "Liveboard: A Large Interactive Display Supporting Group Meetings, Presentations and Remote Collaboration," CHI'92, ACM, pp. 599-607, 1992.
Monochrome Interline Transfer CCD Cameras, Cohu Electronics, http://www.cohu.com, 4 pages.
Series 7700 dotCAM Specifications, Cohu Electronics, 4 pages.
Unaxis Optics Portrait, http://www.optics.unaxis.com, 7 pages.
Xerox Liveboard, http://www.snet.com, 6 pages.

* cited by examiner

*Primary Examiner*—Nitin I. Patel
(74) *Attorney, Agent, or Firm*—Douglas W. Cameron; Ryan, Mason & Lewis, LLP

(57) ABSTRACT

Projector and camera arrangements are provided for use in electronic whiteboard systems. Specifically, the present invention provides projector and camera arrangements wherein the projector and camera share the same imaging optics. By sharing the same projection and camera optics, the distortions that affect the projection system are the same as those of the camera system. Thus, the calibration step required in conventional whiteboard systems where the projector and camera are separate, i.e., each having their own distinct optics and settings, is no longer needed. Further, the arrangements provided in accordance with the invention are self-aligning, even when lens distortions are large and even in the presence of strong perspective effects. The shared optics projector and camera arrangements of the invention also provide for dynamic zooming. In addition, various active and passive optical marker or lightpen designs are provided for use in electronic whiteboard systems.

5 Claims, 9 Drawing Sheets

PROJECTOR AND CAMERA ARRANGEMENT WITH SHARED OPTICS AND OPTICAL MARKER FOR USE WITH WHITEBOARD SYSTEMS

CROSS REFERENCE TO RELATED APPLICATIONS

The present application is a divisional of U.S. patent application identified by Ser. No. 10/315,739, filed on Dec. 10, 2002, now U.S. Pat. No. 7,136,053 which is a divisional of U.S. Pat. No. 6,707,444, issued on Mar. 16, 2004, the disclosures of which are incorporated by reference herein. The present application is related to U.S. patent application identified by Ser. No. 09/642,531 and entitled: "Methods and Apparatus for Associating a User with Content in a Collaborative Whiteboard System," filed on Aug. 18, 2000, the disclosure of which is also incorporated by reference herein.

FIELD OF THE INVENTION

The present invention relates generally to electronic whiteboard systems and, more particularly, to projector and camera arrangements and optical markers for use in such electronic whiteboard systems.

BACKGROUND OF THE INVENTION

An electronic whiteboard system is a processor-based computing system used to input and output information associated with a software application running on the system. Typically, in accordance with such a system, one or more users "write" on the whiteboard using an electronic writing instrument or marker, such as a lightpen. The lightpen permits the user to write with "electronic ink." Electronic ink is the term given to writing that is electronically captured from and/or electronically projected on the whiteboard without using physical ink. A user's writing, as well as any other desired information, is displayed on the whiteboard which is viewable by the one or more users. The data entered on the whiteboard may then be stored for subsequent use by the application being run on the system. Examples of such whiteboard systems are: Ideaboard by 3M Inc. (http://www.3m.com/vsd/ams/11_whtbd.html); e-Beam by Electronics for Imaging, Inc. (http://www.e-beam.com/index_flash.html); SoftBoard by Microfield Graphics, Inc. (http://www.softboard.com/); SMART Board (htttp://www.smartboard.co.uk/product/index.html); Mimio by Virtual Ink Inc. (http://www.virtual-ink.com/ns.shtml); and Liveboard, The Office of the Future: Xerox PARC, Wendy Taylor, PC Computing, pp. 192, January 1995.

Electronic whiteboard systems may be collaborative. A collaborative whiteboard system is a distributed computing system which includes two or more individual electronic whiteboard systems, as mentioned above, in communication with each other while running a collaborative application. While the individual systems, and thus their respective users, are remote from one another, a user at a first location is able to view information written by a user at a second location. This way, the remote users may interact as if they are in the same location. Examples of such whiteboard systems are: Netmeeting by Microsoft, Inc.; and Sametime by Lotus, Inc. (an IBM company).

Whether a single stand-alone system or a collaborative system, a typical electronic front-projection whiteboard system, as illustrated in FIG. 1A, is comprised of a whiteboard screen 2, a writing stylus or lightpen 4, a fixed-position projector 6, a fixed-position camera 8 and a processing system 10. In such a system, the function of projecting images representing a user's writing on the whiteboard screen 2, in accordance with the lightpen 4, is performed by the fixed-position projector 6. As shown in FIG. 1A, the projector 6 has its own imaging optics 7 associated therewith. The fixed-position camera 8, aimed at the writing substrate 2 and the lightpen 4, captures an image of the whiteboard and the light emitted by a lamp associated with the lightpen. Like the projector 6, the camera 8 has its own imaging optics 9 associated therewith. Suitable optical and electronic filtering assure that only the lightpen is sensed among possible background clutter and distractions such as other bright objects. As is known, the presence and location of the lamp of the lightpen in the field of view of the camera may be estimated by various signal processing techniques. Several technologies exist that address the problem of capturing the location of a stylus on a whiteboard. For example, one such technique is used in Xerox's LiveBoard as mentioned in S. Elrod et al., "Liveboard: A Large Interactive Display Supporting Group Meetings, Presentations and Remote Collaboration," CHI '92 May 3-7, 1992, pp. 599-607.

The images projected by the camera on the screen, representing the user's writing strokes, are derived from a display screen buffer. The contents of the display screen buffer depend on optical screen marking events such as those generated by the lightpen. The visual effect that the user's strokes are physically being written on the whiteboard is achieved by the camera projecting the image of the optical marker or lightpen path onto the board.

As is known, the processing system 10 includes processor and memory resources for coordinating the functions performed by the whiteboard screen 2, the lightpen 4, the projector 6 and the camera 8. Accordingly, the system must accurately sense the location of the lightpen on the board and then project its writing actions onto the board. One method for accomplishing these tasks is as follows. The camera and its imaging optics are aimed at the board in order to capture the optical emission from the lightpen. The captured position of the light must then be transformed such that the projected writing trace generated by the projector appears at the tip of the lightpen as it writes. The transformation used to achieve this goal depends on many factors such as the settings and location of the imaging optics of the projector, and the settings and location of the imaging optics of the camera. However, determining the transformation can be a problem.

Such problem associated with determining the transformation can be generically described as follows. A processor produces an image that is being projected onto a physical surface. Find the spatial relationship of a visual marker, which is not necessarily controlled by the processor, relative to the projected image, for fixed optics and settings of the projector. Consider the case in which the marker is observed by a camera. Once this relationship is found, the processor that drives the projector uses the information about the marker to produce visual effects such as mimicking the action of the lightpen on the board.

In accordance with existing whiteboard projector/camera arrangements, the problem is typically solved by employing a calibration procedure, wherein the camera and its optics are calibrated with the projector and its optics so as to determine the proper transformation. Unfortunately, such a calibration procedure is typically disruptive, time consuming and usually ignores lens radial distortion and other hard-to-correct optical lens aberrations.

The same problems also exists in rear-projection whiteboard system. A conventional rear-projection whiteboard system is illustrated in FIG. 1B. The system is comprised of a whiteboard screen 2', an enclosure 3, a writing stylus or lightpen 4', a reflecting mirror 5, a fixed-position projector 6', a fixed-position camera 8' and a processing system 10'. The components and their functions in the rear-projection system in FIG. 1B are essentially the same as those in the front-projection system in FIG. 1A, as described above, with the following exceptions. In the front-projection system, the user is on the same side of the whiteboard screen as the projector, while in the rear-projection system, the user and the projector are on opposite sides of the screen. Also, the screen 2' in the rear-projection system is typically translucent so that the lightpen 4' can be tracked by the camera 8', via the reflecting mirror 5, and so that the user on one side of the screen can view the images projected on the other side of the screen by the projector 6', via the mirror 5. Like the conventional front-projection system, the projector and camera of the rear-projection system each have their own separate imaging optics 7' and 9', respectively. Thus, a similar calibration procedure must be performed to determine the appropriate transformation relationship which, as mentioned above, presents many operational drawbacks.

Thus, it would be highly desirable to solve the problem associated with determining the above-described transformation relationship associated with the projector and camera of an electronic whiteboard system such that the disadvantages associated with the use of a calibration procedure could be avoided.

SUMMARY OF THE INVENTION

The present invention provides projector and camera arrangements for use in such electronic whiteboard systems. Specifically, the present invention provides projector and camera arrangements wherein the projector and camera share the same imaging optics. By sharing the same projection and camera optics, the distortions that affect the projection system are the same as those of the camera system. Thus, the calibration step required in conventional whiteboard systems where the projector and camera are separate, i.e., each having their own distinct optics and settings, is no longer needed. Further, the arrangements provided in accordance with the invention are self-aligning, even when lens distortions are large and even in the presence of strong perspective effects. The shared optics projector and camera arrangements of the invention also provide for dynamic zooming. It is to be appreciated that the invention applies to both front-projection and rear-projection whiteboard systems, as well as other possible projection arrangements.

Thus, in one aspect of the present invention, an image capture and projection apparatus for use in an electronic whiteboard system, comprises: (i) an image capture device, the image capture device tracking a position of at least one stylus associated with the electronic whiteboard system used to enter data in accordance with a surface associated with the electronic whiteboard system; and (ii) an image projection device, the image projection device projecting an image which is viewable on the surface, in proximity of the position of the stylus, and representative of the data entered in accordance with the stylus, wherein the image capture device and the image projection device share at least one imaging lens for capturing and projecting one or more images. It is to be appreciated that the image capture device and the image projection device are preferably physically integrated with one another to form an integrated image capture/projection device.

The present invention also provides active and passive optical markers or lightpens for use in electronic whiteboard systems. Such inventive lightpens preferably provide the following advantages over existing lightpens: (i) they accommodate large whiteboards allowing several people to gather around and contribute; (ii) they are cordless; (iii) they allow writing on non-planar surfaces; (iv) they are robust; and (v) they are extensible to three-dimensional space.

In one aspect of an optical marker of the present invention, an active optical marker device for use in accordance with an electronic whiteboard system, wherein the electronic whiteboard system includes a data entry surface, an image capture device for tracking a position of the optical marker device while the optical marker device is used to enter data in accordance with the data entry surface, and an image projection device for projecting an image which is viewable on the surface, in proximity of the position of the optical marker device, and representative of the data entered in accordance with the optical marker device, comprises: (i) an infrared light-emitting source; and (ii) a switch, operatively connected to the infrared light source, and operative to turn on the infrared light source when the optical marker device contacts the surface and turn off the infrared light source when the optical marker device does not contact the surface, such that the image capture device can capture the infrared light emitted by the optical marker device and the image projection device can project the representative image on the surface.

In one embodiment, the infrared light-emitting source is directed toward the image capture device. In another embodiment, the surface is a reflective surface and the infrared light-emitting source is directed toward the surface. The active optical marker device may also have a low-friction nib connected to the switch, wherein the nib contacts the surface when data is being entered.

In another aspect of an optical marker of the present invention, a passive optical marker system for use in accordance with an electronic whiteboard system, wherein the electronic whiteboard system includes a data entry surface, an image capture device and an image projection device, comprises: (i) an infrared-emitting light source for illuminating the data entry surface; and (ii) an infrared light reflector having a low-friction glide and a non-isotropic surface, the reflector being worn by a user such that the low-friction glide comes into contact with the surface when the user enters data and, in accordance with such data entry, infrared light emitted by the source is reflected from the reflector to the image capture device, such that the image capture device can capture the reflected infrared light and track a position of the reflector, and such that the image projection device can project an image which is viewable on the surface, in proximity of the position of the reflector, and representative of the data entered in accordance with the reflector on the surface.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of various illustrative projection systems that may be used in an electronic whiteboard system. However, it is to be understood that the present invention is not limited to any particular projection system architecture. Rather, the invention is more generally applicable to any projection system architecture (e.g., front and rear-projection arrangements, as well as other possible arrangements) for use in accordance with an electronic whiteboard system in which it is desirable to integrate a camera system in order to avoid the use of a procedure for calibrating the projector system and the camera system in order to establish the transformation relationship described above.

It is to be appreciated that the following detailed description not only provides for illustrative embodiments of inventive projector/camera arrangements for solving problems associated with conventional electronic whiteboard systems, but also provides for various optical marker or lightpen designs for use in whiteboard systems which have many advantages over conventional lightpens. Thus, the remainder of the detailed description will be divided into the following sections for ease of reference: (I) Integrated Projector/Camera Systems; and (II) Optical Markers.

I. Integrated Projector/Camera Systems

Figure 2:
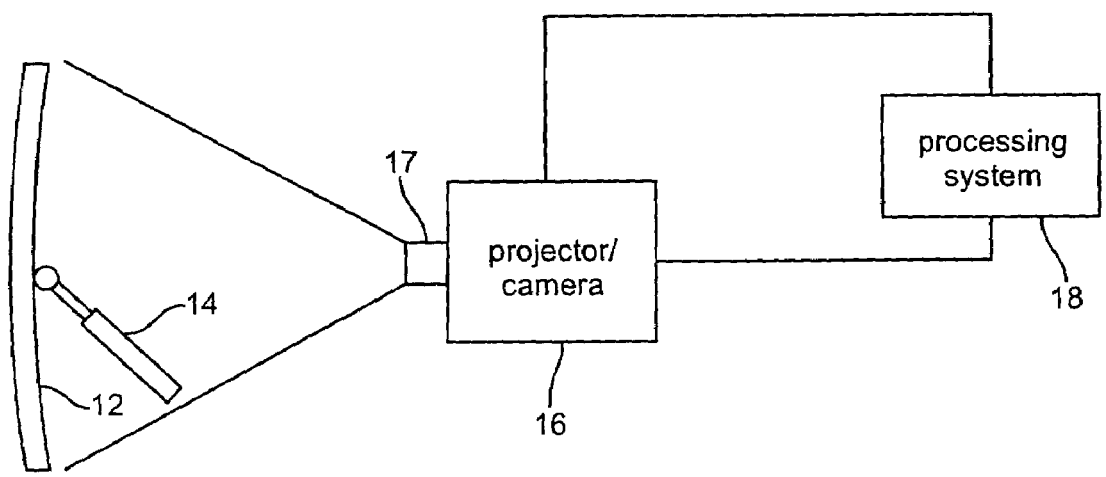
FIG. 2 is a block diagram illustrating a projector and camera arrangement in a whiteboard system according to an embodiment of the present invention.

Referring initially to FIG. 2, a block diagram illustrates a projector and camera arrangement in a whiteboard system according to an embodiment of the present invention. The system shown in FIG. 2 is a front-projection arrangement. As mentioned above, the teachings of the invention are not limited to front-projection systems but rather are applicable to rear-projection systems, as well as other possible arrangements. In any case, as shown, the whiteboard system of FIG. 2 includes a whiteboard screen or substrate 12, a lightpen 14, an integrated projector/camera system 16 with shared optics 17, and a processing system 18.

Figure 1A:
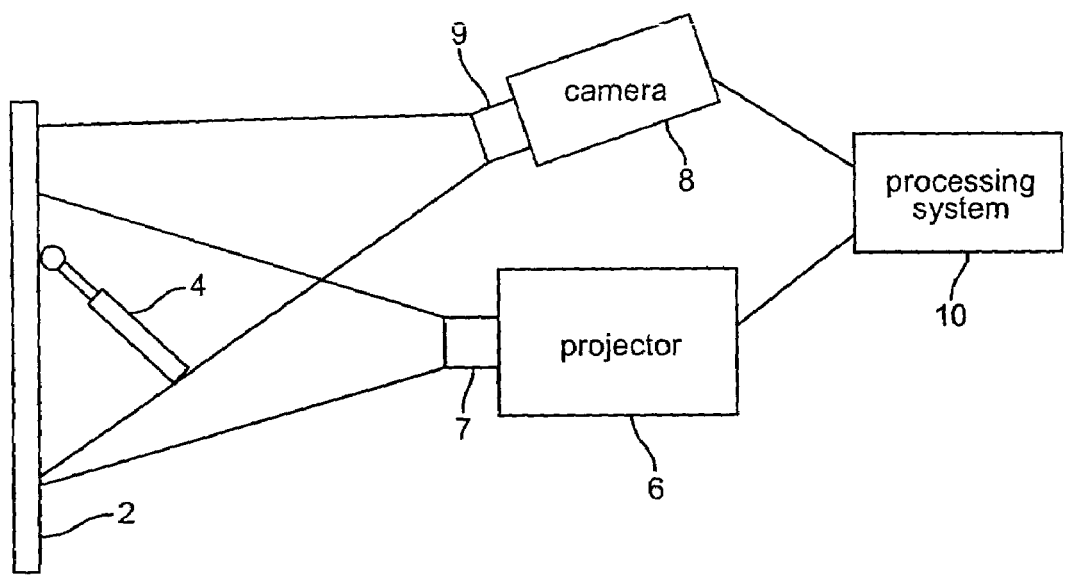
FIG. 1A is a block diagram illustrating a conventional projector and camera arrangement in a whiteboard system.
Figure 1B:
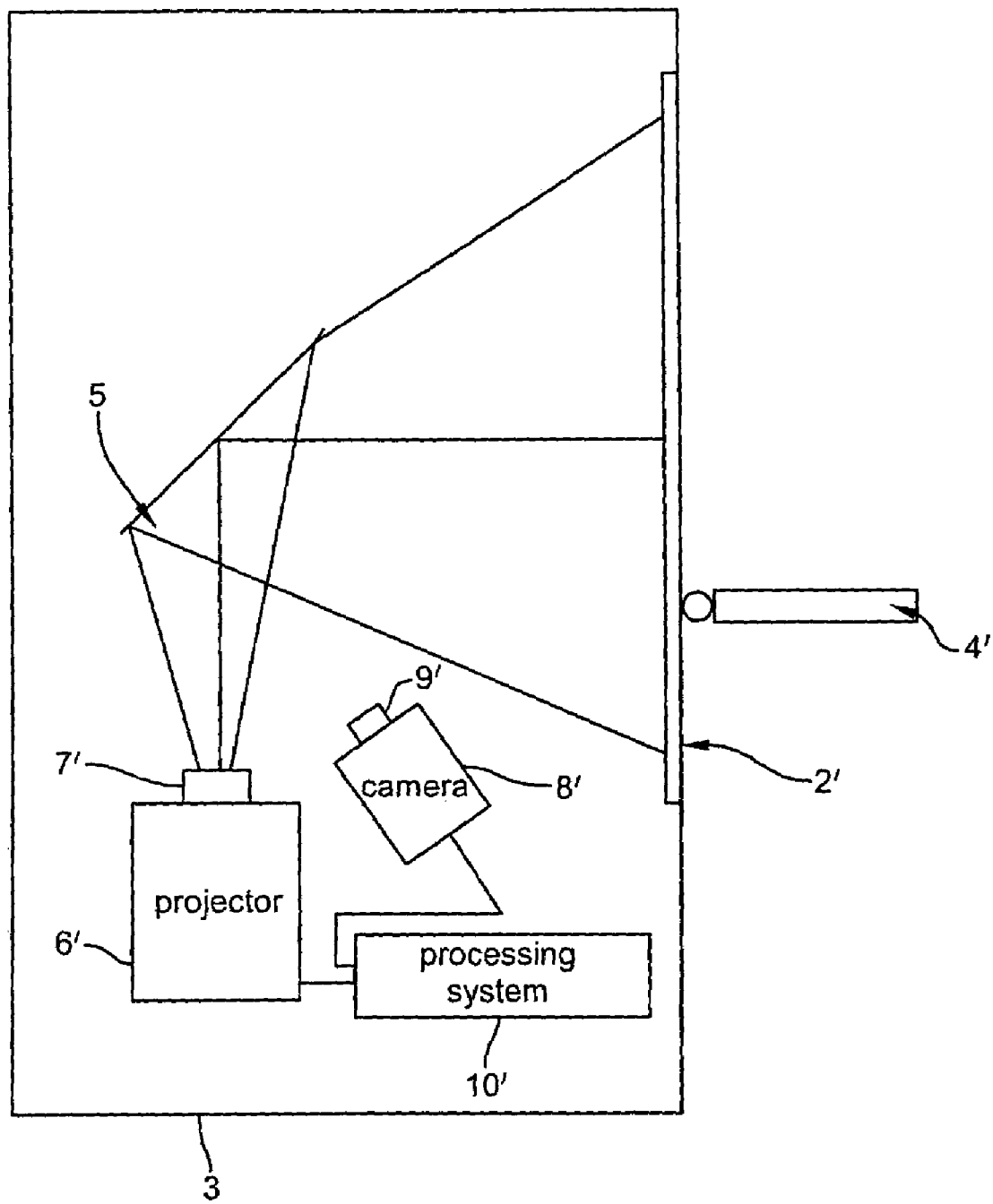
FIG. 1B is a block diagram illustrating another conventional projector and camera arrangement in a whiteboard system.

As is evident by comparison with the conventional arrangements shown in FIGS. 1A and 1B, the whiteboard system of the invention integrates a camera system with a projector system such that the two systems share the same imaging optics. By sharing the same optics, the distortions that affect the projection system are the same as those that affect the camera system. Thus, the calibration step required in conventional whiteboard systems where the projector and camera are separate, i.e., each having their own distinct optics and settings, is no longer needed. Further, such an integrated arrangement allows the system to be self-aligning, even when lens distortions are large and even in the presence of strong perspective effects. The shared optics projector and camera arrangements also provide for dynamic zooming.

Also, as shown in FIG. 2, given the inventive projector/camera arrangement, the whiteboard substrate 12 may be non-planar. Further, the lightpen 14 may be a conventional light emitting stylus but is preferably one of the optical markers to be described in section II of this detailed description.

The processing system 18 includes one or more processors, associated memory and various input/output devices for coordinating the functions performed by the whiteboard screen 12, the lightpen 14 and the projector/camera system 16. It is to be appreciated that the term "processor" as used herein is intended to include one or more processing devices, e.g., a CPU (central processing unit) or other processing circuitry, which may be utilized in a computer system employed in conjunction with the invention. Also, it is to be understood that each processor has memory associated therewith such as, for example, RAM, ROM, flash memory, a fixed memory device (e.g., hard drive), or a removable memory device (e.g., diskette). In addition, the term "input/output devices" as used herein is intended to include, for example, one or more input devices, e.g., keyboard, mouse, etc. for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software instructions or code for performing whiteboard system operations may be stored in one or more of the associated memory devices (ROM, fixed or removable memory) and, when ready to be utilized, loaded into RAM and executed by a CPU.

In accordance with a preferred embodiment of the invention, the presence and location of the lamp of the lightpen in the field of view of the camera is estimated by a "computer vision" technique, although various other methods may be used. The field of computer vision, which is part of the larger field of artificial intelligence, deals with the computer interpretation of the physical world around us using capture of visible or invisible light. Important tasks dealt with by "computer vision" algorithms are image segmentation ("what objects are in a scene"), registration ("how do the various captured images relate to one another in space and time"), photogrammetry and shape recognition ("what shape do the objects have and do they match with one the system has been made aware of before"). In the context of electronic whiteboard systems, a computer vision task referred to as "tracking" is used. Tracking involves following an object in space once the object has been found. Finding the object in the scene is commonly done in a separate well-known object acquisition phase. In the whiteboard case, the object is a lightpen and the vision algorithm estimates the location of the captured image of the light emitted by the pen.

Furthermore, it is to be appreciated that an integrated projector/camera system of the invention, and/or the inventive optical markers to be described below, may be employed in accordance with collaborative whiteboard systems as described in the U.S. patent application identified by attorney docket no. YOR9-2000-0220-US1 and entitled: "Methods and Apparatus for Associating a User with Content in a Collaborative Whiteboard System," filed concurrently herewith and incorporated by reference herein It is to be understood that the integrated projector/camera system embodiments of the invention depend on the projection technology being employed. Thus, the following descriptions provide detailed explanations of integrated projector/camera systems according to the invention based on various illustrative digital projection technologies. Particularly, illustrative embodiments including liquid crystal-based lightvalves and micromirror-based lightvalves will be explained below. However, as mentioned above, the invention is not limited to any particular projection technology and applies to both front and rear-projection systems. It is also to be understood that elements with the same reference numerals in different figures have the same functions unless otherwise specified.

Figure 3:
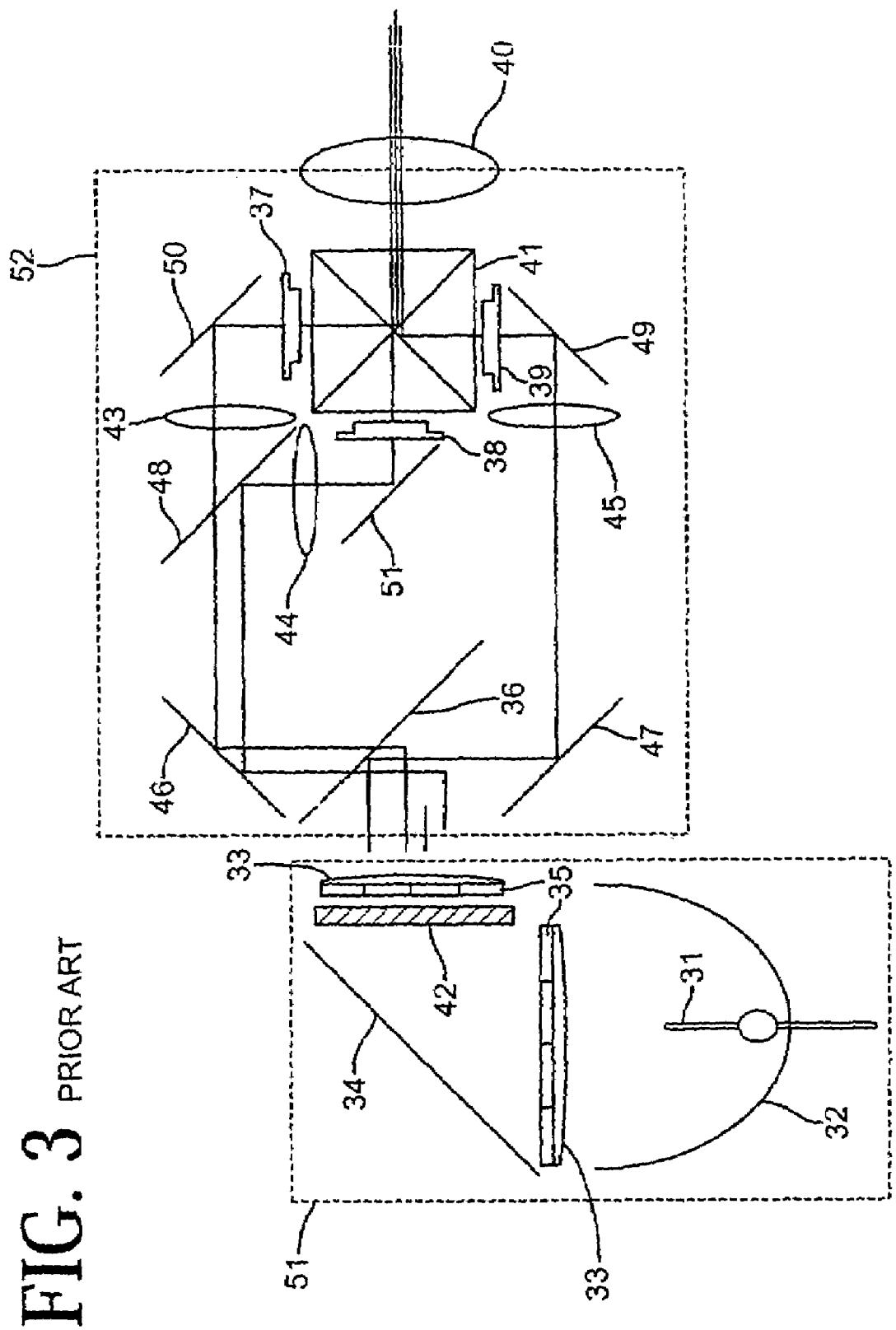
FIG. 3 is a block diagram illustrating a design of a conventional digital color projector system based on transmissive lightvalves.

Referring now to FIG. 3, a block diagram illustrates a design of a conventional digital color projector system based on transmissive liquid crystal-based lightvalves. The projector system operates as follows. Light produced by an arc lamp 31 is reflected by a reflector/cold mirror 32. The light then passes through a fly's eye integrator 35 which has a coating 33 to block UV/IR (ultraviolet and infrared). A cold mirror 34 reflects the light towards a PCS (Polarization Conversion System) 42 and a fly's eye integrator 35, which also has a UV/IR coating 33. Elements 31, 32, 33, 34, 35 and 42 comprise an illumination module 51. All other components shown in FIG. 3 comprise a light engine 52. Dichroic X-mirror 36 splits the white light into R (Red), G (Green) and B (Blue) components. Mirror 46 reflects the R and G components of the light toward dichroic X-mirror 48 which passes R and reflects G. Mirror 54 directs G toward green lightvalve 38. Mirror 50 directs R toward red lightvalve 37. Mirror 47 directs B toward blue lightvalve 39. The lightvalves 37, 38 and 39 are controlled by the R, G, B signals that are supplied to the projector, typically from a computer monitor port. The R, G, B signal lines that control the lightvalves are not shown for clarity. The dichroic X-cube 41 combines the R, G, B components of the light into a full color image after the three color components have passed through the lightvalves. Projection lens 40 then creates an image on a projection surface (not shown).

Figure 4:
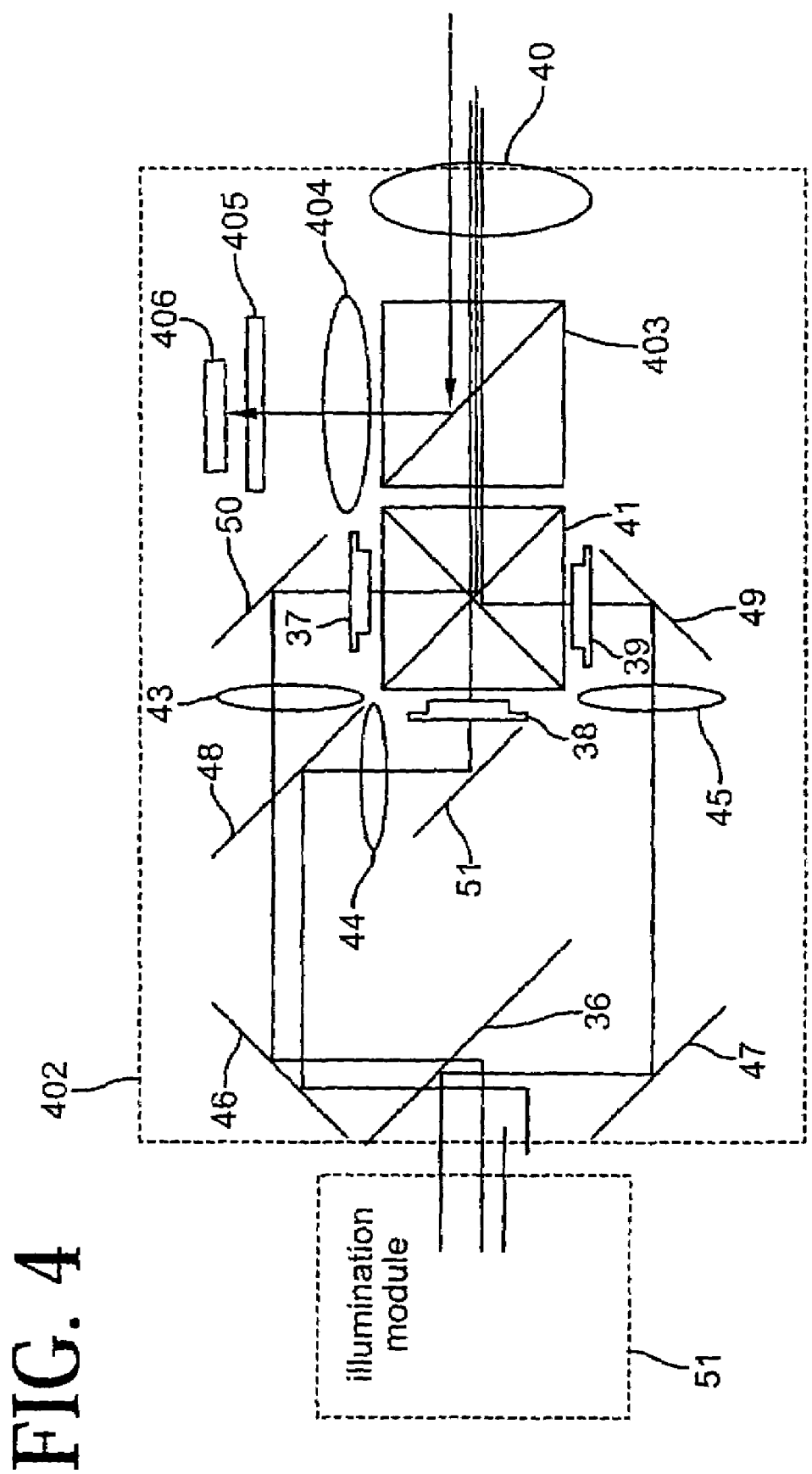
FIG. 4 is a block diagram illustrating a design of a digital color projector/camera system based on transmissive lightvalves according to an embodiment of the present invention.

Referring now to FIG. 4, a block diagram illustrates a design of a digital color projector/camera system based on transmissive liquid crystal-based lightvalves according to an embodiment of the present invention. Specifically, as is evident by comparison to FIG. 3, FIG. 4 introduces the new optical elements in this transmissive lightvalve design that allow the capture of light through the projection lens, i.e., through the same image optic that are used to project an image on the whiteboard. Thus, through the projection optics, the projected image is passed and any light sources in the field of view of the projection optics are captured. This includes a movable infrared (IR) light emitter on a stylus located at some point in the projection plane. The stylus is the optical marker or lightpen employed by a whiteboard user to enter strokes. It is to be further appreciated that instead of a traditional projection screen, the system can project onto more arbitrary surfaces in three-dimensional space. Furthermore, the stylus need not follow the surface.

Thus, as shown in FIG. 4, the transmissive lightvalve implementation of the invention adds an IR CCD (charge coupled device) camera, an IR (light)-transmitting/visible (light)-blocking filter, an IR refocusing lens, and an IR-reflecting/visible-transmitting cube. It is to be appreciated that IR enhanced CCD sensors are available, for example, from COHU Electronics (http://www.cohu.com). The other new elements are also readily commercially available and/or may be implemented by one ordinarily skilled in the art given the teachings herein. As for other components in the integrated projector/camera system of the invention, such elements are also readily available and known to those ordinarily skilled in the art. Transmissive lightvalves are available, for example, from Epson Corp. and Sony Corp.; reflective light valves are manufactured by 3-5 Systems Corp. and JVC Corp. Cold reflectance mirrors and dichroic X-cubes are manufactured, for example, by Unaxis Balzers, Ltd. (http://www.optics.unaxis.com). The latter also produce special dichroic optical coatings. It is to be understood by those ordinarily skilled in the art that the new elements should preferably be kept as compact as possible, so as to keep the projection distance (not shown) to a minimum. "Compact" in the present context, for example, implies keeping projection lens 40 and X-cube 41 in close proximity. In FIG. 4, for example, element 403 puts a lower bound on the distance between elements 40 and 41. The approximate size of the X-cube is of the order of 4 centimeters (cm). Thus, in such an exemplary embodiment, any implementation of the integrated projector/camera of the invention in which the distance between elements 40 and 41 is less than this distance (about 4 cm) may be termed "compact."

More specifically, FIG. 4 shows an embodiment of the present invention using transmissive lightvalves. Illumination module 51 is identical to that shown in FIG. 3. The light engine 402 now contains new elements 403, 404, 405 and 406. It is to be appreciated that the light engine also employs elements 36 through 41 and 43 through 50, as shown, which function identically to that which has been explained above in the context of FIG. 3 with respect to image projection functions. Element 403 is an IR-reflecting, visible-transmitting cube which passes the valved R,G,B light to the projection lens 40. Element 403 also reflects IR light entering the projector through the projection optics 40 through IR refocusing lens 404 and IR transmitting, visible-blocking filter 405 toward IR CCD sensor 406. Thus, element 404 forms an image of IR radiation onto the IR sensor 405. In a whiteboard application, using an IR lightpen sensor 406 records the image of one or more lightpens.

Note that both outgoing R, G, B light and incoming IR light passes through the same projection (imaging) optics 40. Thus, a change in the projected image such as that caused by panning, zooming, etc., of the projector is also sensed by the CCD sensor 406. Thus, the CCD sensor operates as the "camera" in the integrated projector/camera arrangement of the invention.

Figure 5:
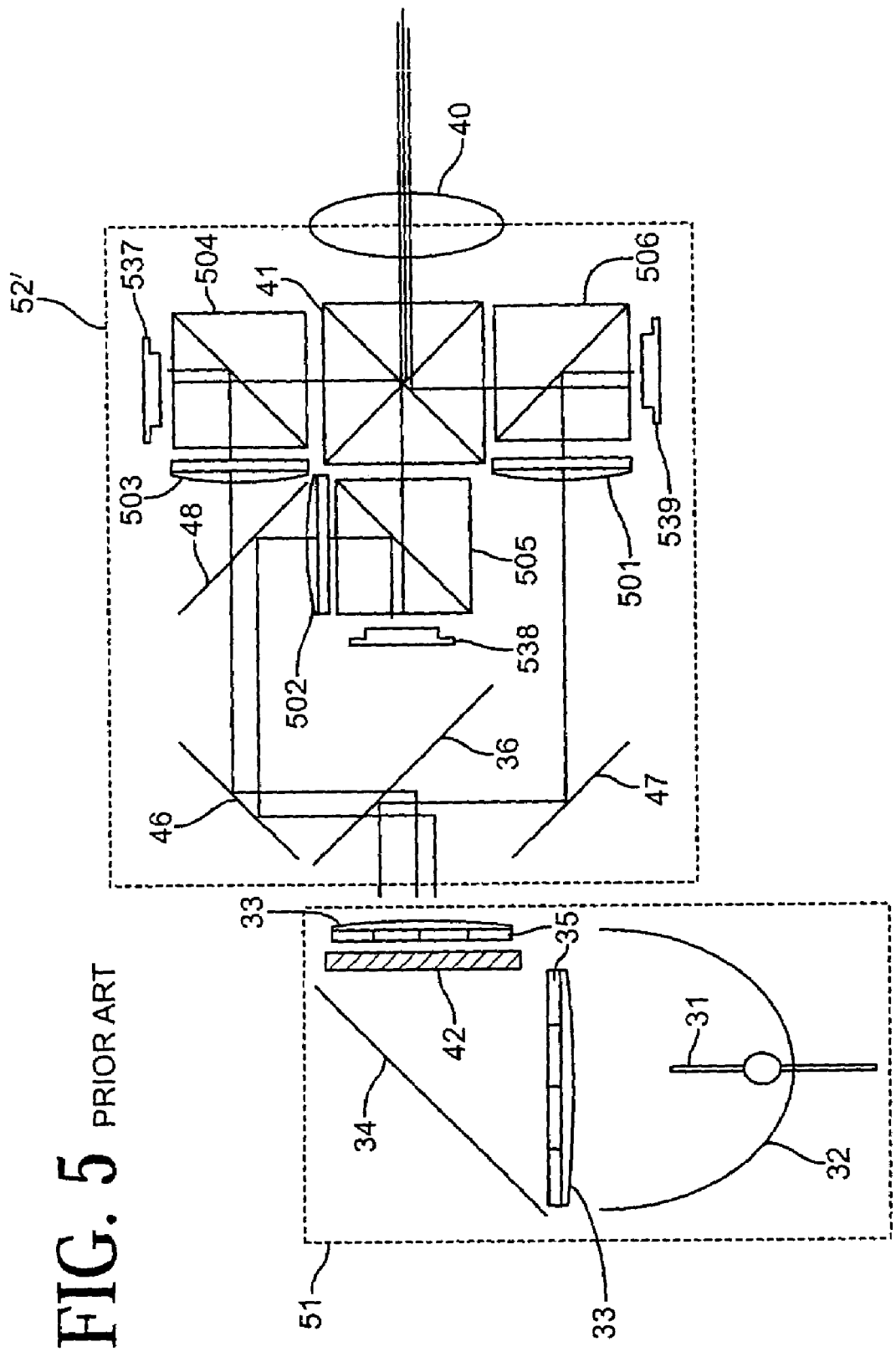
FIG. 5 is a block diagram illustrating a design of a conventional digital color projector system based on reflective lightvalves.

Referring now to FIG. 5, a block diagram illustrates a design of a conventional digital color projector system based on reflective liquid crystal-based lightvalves. The illumination module 51 is the same as in FIGS. 3 and 4. The light engine 52' splits the light from the illumination module into R, G, B components using mirror elements 46, 47 and 48. Instead of passing directly through a transmissive light valve, the R,G,B components now pass through pre-polarizers 503, 502 and 501, respectively, and polarizing beam splitters (PBS) 504, 505 and 506, respectively. Lightvalves 537, 538 and 539 respectively reflect the R, G, B components, only at those pixel locations selected by the R, G, B signals controlling the lightvalves. The resulting reflected light for each color is combined by the dichroic X-cube 41. The combined light is projected by projection lens 40.

Figure 6:
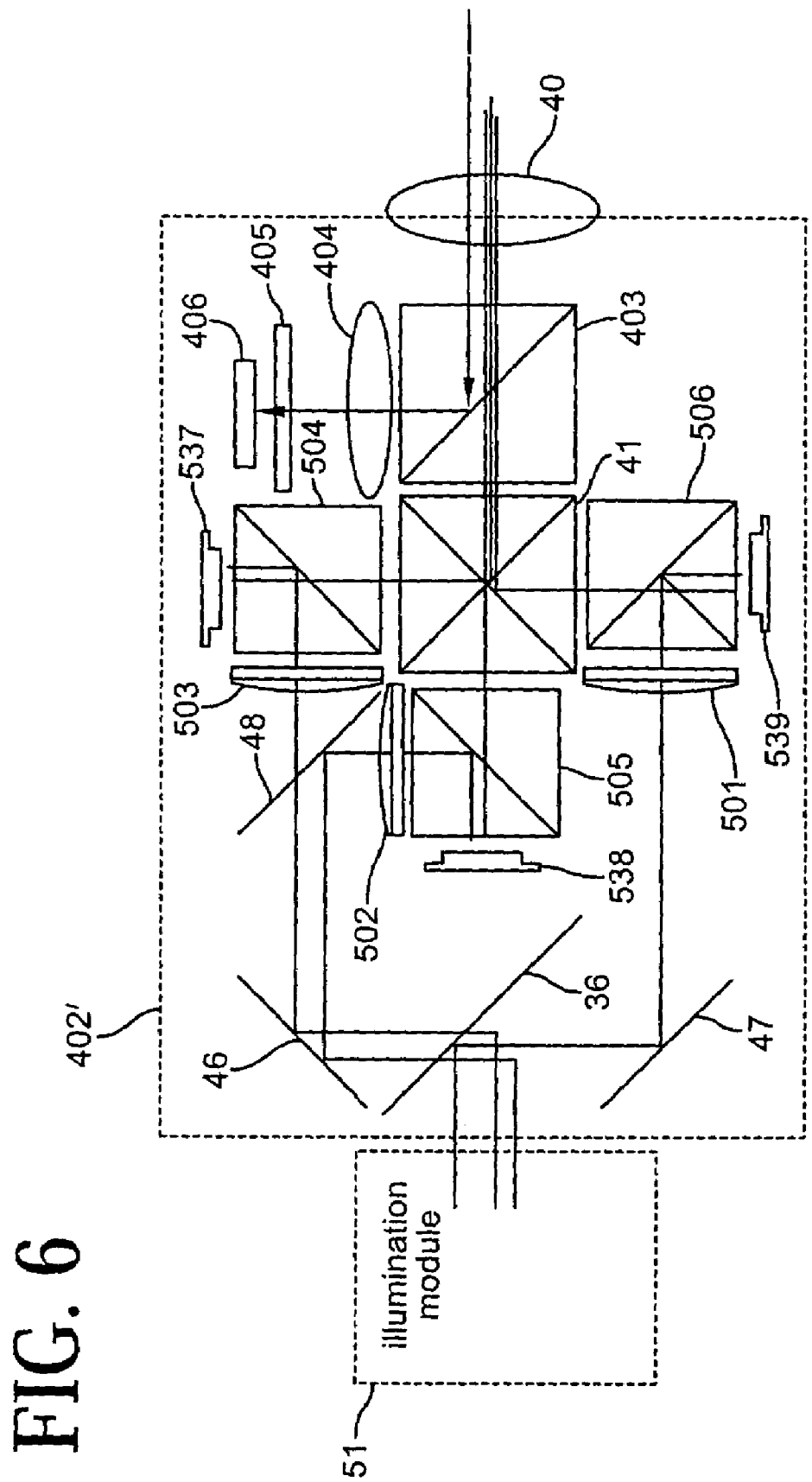
FIG. 6 is a block diagram illustrating a design of a digital color projector/camera system based on reflective lightvalves according to an embodiment of the present invention.

Referring now to FIG. 6, a block diagram illustrates a design of a digital color projector/camera system based on reflective liquid crystal-based lightvalves according to an embodiment of the present invention. FIG. 6 shows the integrated projector/camera that results by adding elements 403, 404, 405 and 406 to the projector shown in FIG. 5. The new elements 403, 404, 405 and 406 added in light engine 402' are functionally identical to those described above in the context of FIG. 4. The only difference in overall operation is in the manner of valving the R, G, B light, being reflective in FIG. 6 and transmissive in FIG. 4. Thus, in the reflective arrangement shown in FIG. 6, the incoming IR light is imaged onto sensor 406 after passing through refocusing lens 404, IR-transmittng and visible-blocking filter 405, and IR-reflecting and visible-transmitting cube 403.

Figure 7:
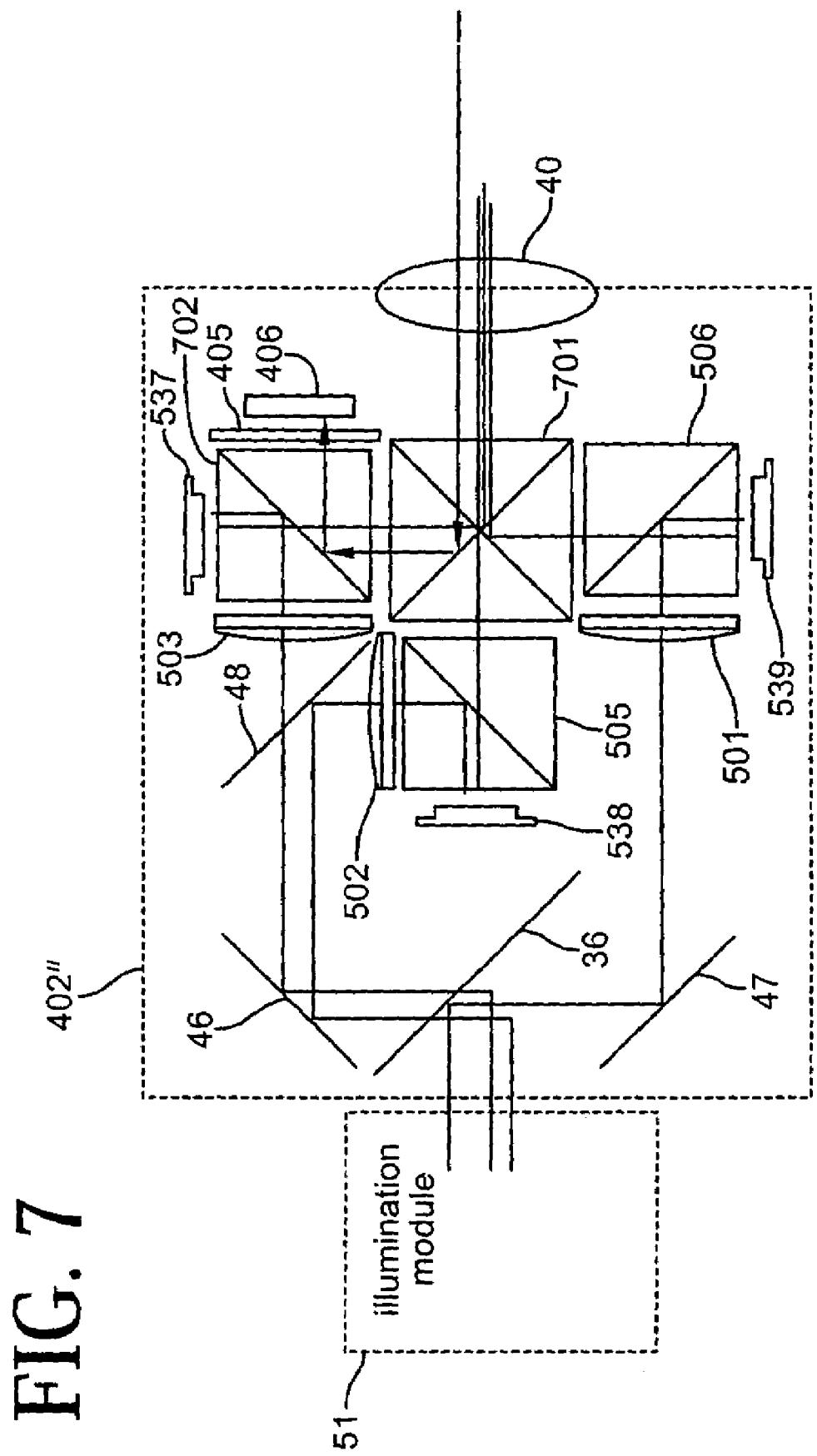
FIG. 7 is a block diagram illustrating a design of a digital color projector/camera system based on reflective lightvalves according to another embodiment of the present invention.

Referring now to FIG. 7, a block diagram illustrates a design of a digital color projector/camera system based on reflective light liquid crystal-based valves according to another embodiment of the present invention. Particularly, this alternative embodiment allows projection lens to remain closer to the dichroic X-cube. By adding a (Red+IR)-reflecting dichroic interface to the dichroic X-cube 41 in the light engine 402", a new element 701 results that allows a more compact integral projector/camera configuration. The R, G, B light valving is reflective as in FIG. 6, but the function of R, G, B combiner and IR reflector is done in a single optical element 701. This allows the projection lens to be as close to the beam combining X-cube as before, and therefore shortens the projection distance. Note that the polarizing beam splitter for the red component is also modified by adding an internal IR reflecting coating. The new PBS is shown as element 702. The arrows show the path taken by IR light: it enters the projection lens 40, is reflected by the dichroic X-cube's internal IR reflecting surface and again by the IR-reflecting surface of the PBS for the R (red) component. After passing through an IR-transmitting, visible-blocking filter 405, the IR is sensed by the IR CCD sensor (camera) 406.

Figure 8:
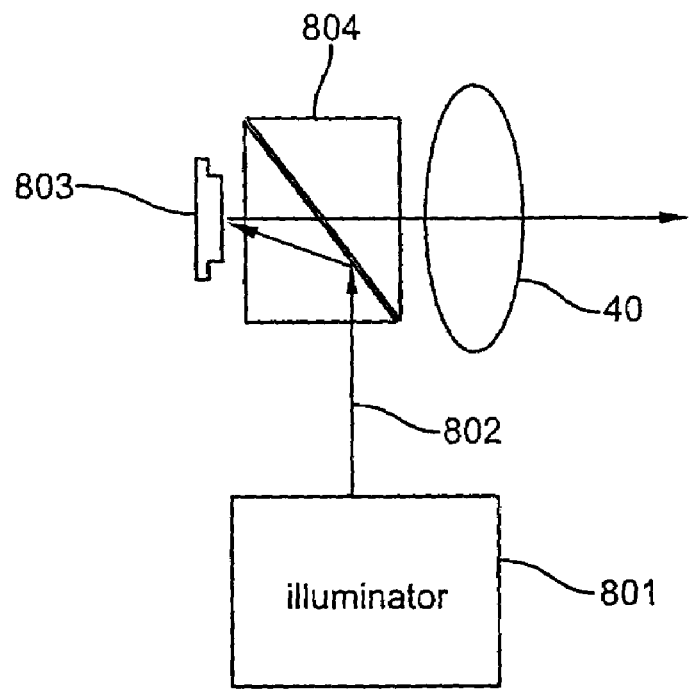
FIG. 8 is a block diagram illustrating a design of a conventional digital color projector system based on digital micromirror deflection.

Referring now to FIG. 8, a block diagram illustrates a design of a conventional digital color projector system based on digital micromirror deflection. The projectors described in FIGS. 3-7 all use lightvalving based on LCD (Liquid Crystal Device) technology. Texas Instruments Corp. has developed lightvalves based on the individual deflection of micromirrors placed in an array. These devices are known as DMD's (digital micromirror device). FIG. 8 shows a projector based on DMD technology. Illuminator 801 produces uniform R, G, B light 802 sequentially. Thus, the R, G, B light is multiplexed in time. During the red phase, DMD device 803 is being addressed by the red signal. During the green phase, it is being addressed by the green signal, etc. The TIR (total internal reflection) prism 804 causes the light (either R, G, or B) to be trapped inside the prism when the micromirror deflects the (R, G or B) light off-axis, or the light is passed through the projection lens 40. Projectors of this type are becoming more commonplace, especially in movie theaters.

Figure 9:
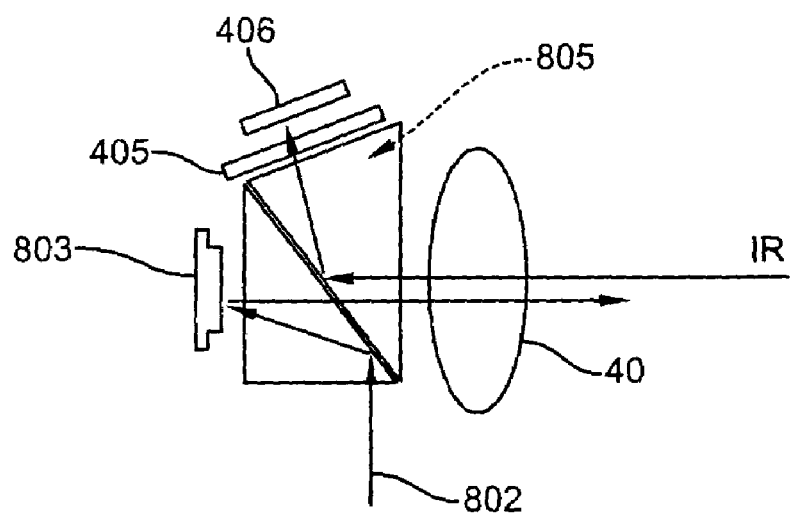
FIG. 9 is a block diagram illustrating a design of a digital color projector/camera system based on digital micromirror deflection according to an embodiment of the present invention.

Referring now to FIG. 9, a block diagram illustrates a design of a digital color projector/camera system based on digital micromirror deflection according to an embodiment of the present invention. The TIR 805 in the integral projector/camera has an internal coating that reflects IR and transmits the visible light. The arrows indicate IR entering the projection lens 40, being reflected by the aforementioned coating upward through filter 405 which is IR-transmitting, visible-blocking onto the IR CCD 406. As before, IR radiation such as that coming from one or more lightpens at the projection plane is imaged onto the IR CCD. This is the camera part of the projector/camera system. Again, as in FIGS. 4, 6 and 7, because the projection optics are shared by the projector and camera, the system is immune to all influences that would invalidate the calibration of a system in which camera and projector are separate entities.

To explain further how the present invention provides for self-alignment without the need for calibration, consider an exemplary case in which the projector/camera system is active and displaying some image on the projection screen. Let the projected image be half the size of the projection screen and centered on the screen. Any IR light source within the bounds of the projected image will always be imaged onto the entire area of the IR CCD device 406. Suppose now that a user wishes to double the size of the projected image on the projection screen. This can be accomplished by zooming the projection lens 40 such that the projected image occupies the whole projection screen. Zooming the projection lens 40 has no effect on the size and location of the image of any IR sources in the plane of the IR CCD device 406. Similarly, panning and tilting of the projector/camera has no effect on location, size and orientation of the image of IR sources in the projection plane.

Another example of self-alignment is the case in which the projector/camera projects off-axis. This happens, for example, when the projector/camera is ceiling-mounted projecting downward onto a vertical wall. The projected image will take the shape of a trapezoid. This is known as keystone distortion. If we have an IR source within this trapezoid and observe it with a CCD camera which is on-axis in a conventional arrangement, a calibration procedure is needed during which the system computes the mapping from the projected image, which appears distorted in the plane of the CCD camera, to a rectangular image defined in the CCD sensor. When the camera and/or the (separate) projector's parameters are changed, the calibration procedure must be repeated. The invention ensures that the IR image observed by the IR CCD is never distorted due to changing the parameters of the projector/camera such as projector/camera aim (tilt and panning) as well as zoom. This is achieved by mechanical and optical integration, i.e., the camera and projector move together because they are mechanically locked together. The camera and projector also track optically because they use the same projection optics.

II. Optical Markers

In addition to the use of one of the integrated projection/camera systems described above, an electronic whiteboard system may also preferably include a lightpen or optical marker or lightpen according to the present invention, as described below. For example, such an inventive lightpen may be employed as lightpen 14 in FIG. 2. However, it is to be appreciated that the inventive lightpens may be employed in conventional electronic whiteboard systems, e.g., lightpens 4 and 4' in FIGS. 1A and 1B, respectively.

The optical marker designs of the invention allow optical motion capture for large whiteboards. The problem is how to obtain the location of one or more writing styli on a whiteboard surface or, when more than one sensing camera is used, the location of a marker in three-dimensional space. As will be evident, advantages of the invention are that a lightpen formed according thereto: (i) accommodate large whiteboards allowing several people to gather around and contribute; (ii) are cordless; (iii) allow writing on non-planar surfaces; (iv) are robust; and (v) are extensible to three dimensions. The inventive markers are based on infrared (IR) sensing. We rely on a camera responsive to IR. Two embodiments will be given as follows: (1) an active marker; and (2) a passive marker.

(a) Active Marker

Figure 10:
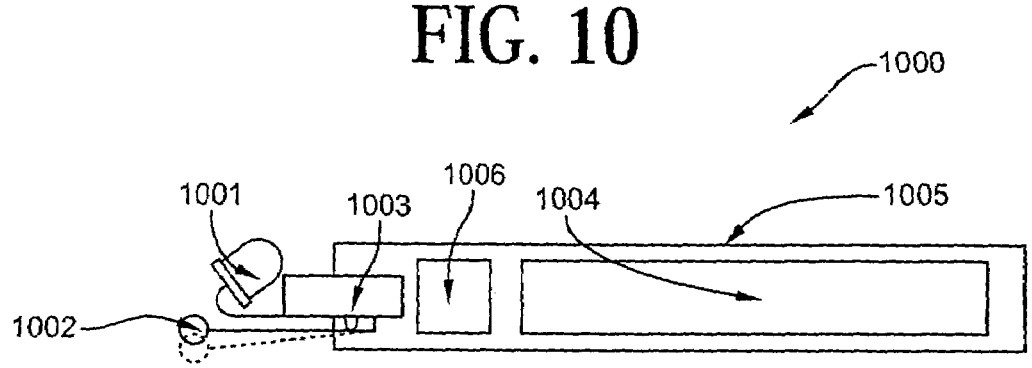
FIG. 10 is a block diagram illustrating an active optical marker according to an embodiment of the present invention.

FIG. 10 is a block diagram illustrating an active lightpen for use in a whiteboard system according to a first embodiment of the present invention. As shown, a lightpen 1000 comprises a light source 1001 used by the capturing camera to track the motion of the pen, a low-friction nib 1002 and a lever/snap type microswitch 1003 for indicating contact with the screen, a power supply 1004 for powering pen components, an enclosure 1005 for housing pen components, and light driver electronics 1006 for generating the light signal and otherwise controlling operations of the pen.

In this embodiment, the stylus is fitted with an IR light source 1001. The light source aims back at the camera that captures the whiteboard thus increasing the brightness. Alternatively, the light source may reflect off the board and be sensed by the capture camera. The low friction nib 1002 is preferably made from a low friction and non-marring material such as Teflon(R). Whenever the stylus is pressed against the writing surface, the light source is turned on by the snap-through type microswitch 1003.

Current to the light source is supplied by one or more batteries, i.e., power supply 1004. The light source is preferably modulated with a carrier, e.g., 40 kilohertz, which is common in IR remote devices. The capture camera passes only signals near the carrier frequency and thereby is quite robust and immune to ambient light sources near the emitter's wavelength. The camera is preferably fitted with an IR-pass/visible reject filter, as illustrated above in the inventive integrated projector/camera systems.

The light source should be as close as possible to the whiteboard contact area of the stylus so that tilting of the stylus has minimal effect. The light source should have a wide radiation pattern, e.g., 40 degrees. In a preferred embodiment, the light source is aimed away from the whiteboard and directly toward the camera. This has the advantage that the reflective properties of the whiteboard are immaterial. However, the penalty paid is a slight sensitivity to stylus attitude.

Figure 11:
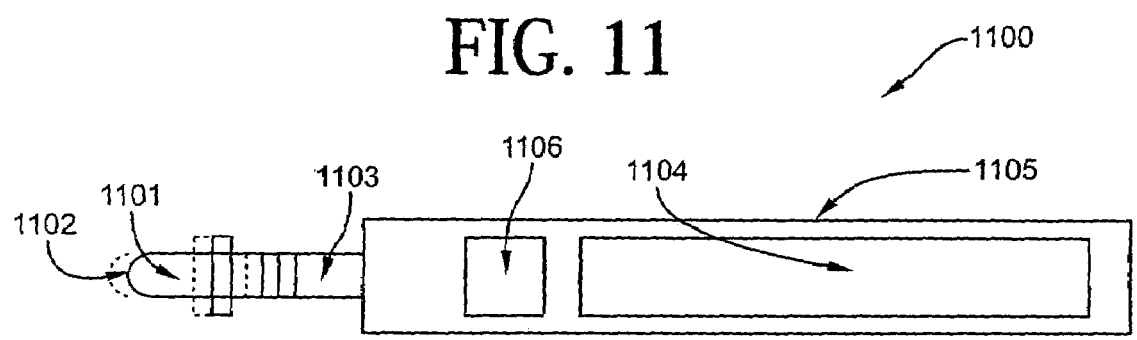
FIG. 11 is a block diagram illustrating an active optical marker according to another embodiment of the present invention.

Referring now to FIG. 11, a block diagram illustrates an active optical marker according to another embodiment of the present invention. Specifically, FIG. 11 illustrates a reflection-based active marker. As shown, a lightpen 1100 comprises a light source 1101 used by the capturing camera to track the motion of the pen, a low-friction nib 1102 and a snap type axial microswitch 1103 for indicating contact with the screen, a power supply 1104 for powering pen components, an enclosure 1105 for housing pen components, and light driver electronics 1106 for generating the light signal and otherwise controlling operations of the pen.

In this embodiment, the light source is activated by pressing the marker against the whiteboard. The marker sensing system, i.e., capture camera, reacts to the light reflected off the whiteboard. Therefore, this approach is dependent on the reflective properties of the whiteboard, as opposed to the approach used in FIG. 10. The dotted sections show the marker in its un-depressed state (light off). Here, the light source should also be a low-friction surface. To achieve that, the light source should preferably be coated with a low-friction coating such as Teflon(R). It is understood that the lightpen as described in FIG. 11 may be used in a back-projection system in which the user and the projector and camera are on opposite sides of the whiteboard. In that case, the whiteboard is translucent and the light from the lightpen is sensed through the whiteboard surface. A well-known advantage of back-projection systems is that users cannot block the projection light. A disadvantage is their higher cost.

(b) Passive Marker

Figure 12:
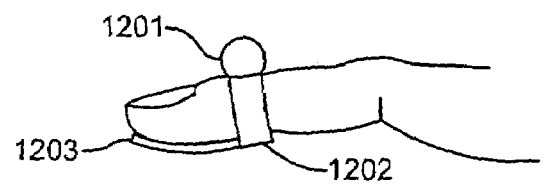
FIG. 12 is a block diagram illustrating a passive optical marker according to an embodiment of the present invention.

A passive marker according to the invention also requires a camera that responds to IR, as in the active marker embodiments. Furthermore, there is a bright IR source which illuminates the whiteboard. Each participant in the whiteboard session wears an IR reflector on his/her hand in an area that executes the motions of a pen during writing. This is illustrated in FIG. 12. As with all front-projection systems, care must be taken that the reflective marker or markers are visible to the camera. That is, the reflector 1201 may typically be worn over the tip of the index finger using a band 1202. A low-friction glide nib 1203 is attached to band 1202. The reflector. 1201 reflects diffusely such that its orientation is of little consequence to the reflected signal strength. IR reflectors of this type are known in three-dimensional motion-capture systems.

In this mode of operation, it is clearly advantageous if the whiteboard is not reflective. Reflectors of this type are known in the art. The reflectors used here differ in that they are combined with a low-friction glide and that the reflector surface may be non-isotropic (through texture or hologram) so that the reflector may have its own identity.

All markers discussed above may express the identity of its user. For example, the modulation of the light source can carry a user-specific code. In the case of the reflective marker, the reflective properties of the marker can be made user-specific by choosing IR reflectors with anisotropic (non-isotropic) properties, e.g., so as to scatter the reflected light in a unique pattern. The latter may be accomplished by using custom-textured reflective surfaces such as holograms.

We have implemented a preferred version of a whiteboard system based on an active marker, based on infrared, unmodulated light. The latter implementation puts no synchronization requirement on the camera. However, in a preferred embodiment, we did put a red optical filter on the camera lens, passing wavelengths greater than that of red light. The camera put out an NTSC signal which was captured by a video capture board. In a feasibility experiment, the (interpolated) resolution of the device was 480× 640 pixels.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A passive optical marker system for use in accordance with an electronic whiteboard system, the electronic whiteboard system including a data entry surface, an image capture device and an image projection device, the passive optical marker system comprising:

an infrared-emitting light source for illuminating the data entry surface; and an infrared light reflector having a low-friction glide and a non-isotropic surface, the reflector being worn by a user such that the low-friction glide comes into contact with the surface when the user enters data and, in accordance with such data entry, infrared light emitted by the source is reflected from the reflector to the image capture device, such that the image capture device can capture the reflected infrared light and track a position of the reflector, and such that the image projection device can project an image which is viewable on the surface, in proximity of the position of the reflector, and representative of the data entered in accordance with the reflector on the surface.

2. The system of claim 1, wherein the non-isotropic surface of the reflector is unique as compared to other reflectors.

3. The system of claim 1, wherein the infrared light reflector is worn over a tip of an index finger of a user.

4. The system of claim 1, wherein the infrared light reflector reflects the infrared light diffusely such that an orientation of the infrared light reflector does not significantly affect a reflected signal strength.

5. The system of claim 1, wherein the data entry surface is not reflective.

* * * * *